United States Patent [19]
Hayward, Jr.

[11] Patent Number: 4,463,736
[45] Date of Patent: Aug. 7, 1984

[54] CHAMBERED ROTARY METERING DEVICE

[76] Inventor: Wallace Hayward, Jr., 9630 Nelson, Kansas City, Kans. 66109

[21] Appl. No.: 385,701

[22] Filed: Jun. 7, 1982

[51] Int. Cl.³ .................. G01F 11/10; G01F 11/00; F02M 21/00
[52] U.S. Cl. .................. 123/527; 123/DIG. 12; 48/180 M; 48/189; 137/99.5; 222/265; 222/368; 251/309
[58] Field of Search .......... 48/189.5, 180.1; 222/367, 368, 265, 271; 123/DIG. 12, 527, 450; 137/624.13, 99.5; 261/83, 84; 251/208, 209, 309, 304

[56] References Cited
U.S. PATENT DOCUMENTS
2,720,344 10/1955 Isreeli et al. .................. 222/368
4,180,188 12/1979 Aonuma et al. .................. 222/368

FOREIGN PATENT DOCUMENTS
1223812 9/1966 Fed. Rep. of Germany ...... 222/368
2020399 11/1979 United Kingdom .......... 137/624.13

Primary Examiner—S. Leon Bashore, Jr.
Assistant Examiner—K. M. Hastings
Attorney, Agent, or Firm—Litman, Day & McMahon

[57] ABSTRACT

A fluid metering device is provided including a chambered rotor for metering correctly proportioned mixtures of air and a vaporized fuel to an internal combustion engine. The rotor includes radially disposed chambers and is enclosed in a housing having an inlet port and an outlet port. Upon rotation of the rotor the chambers are alternately biased into flow communication with the inlet port and the outlet port. The inlet port is in flow communication with a gaseous fuel supply and the outlet is in flow communication with an intake to the internal combustion engine. The speed of the rotation of the rotor is adjustable to vary the amount of gaseous fuel presented to the engine for selectively varying the output of the engine.

15 Claims, 10 Drawing Figures

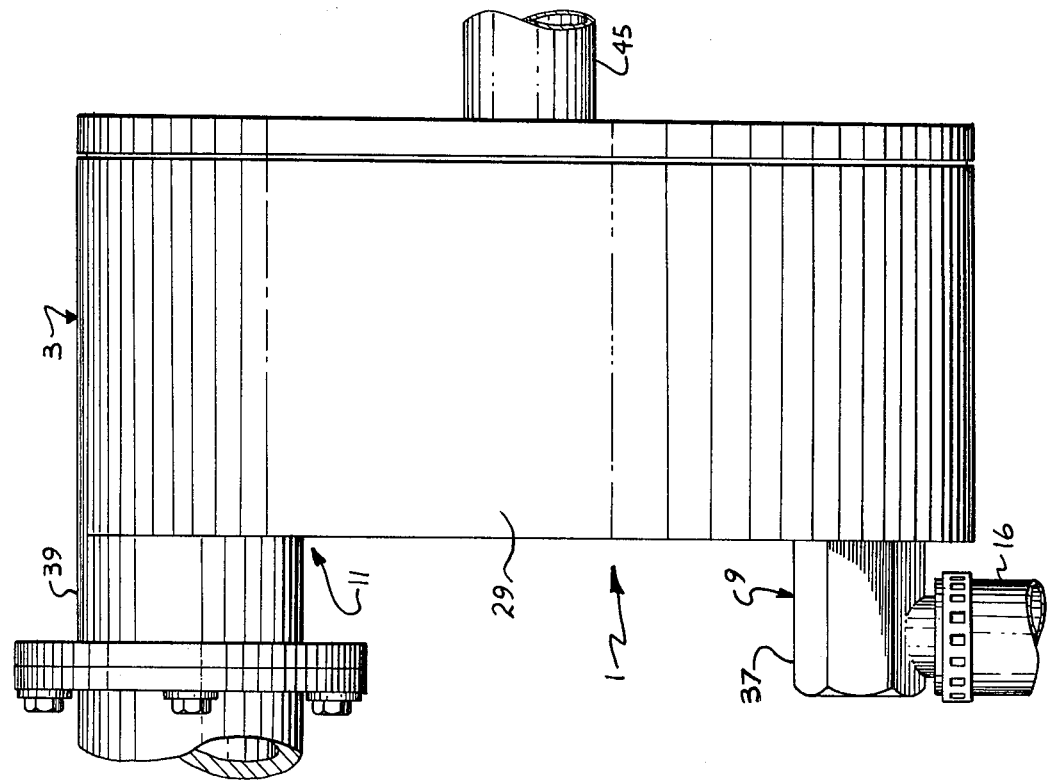
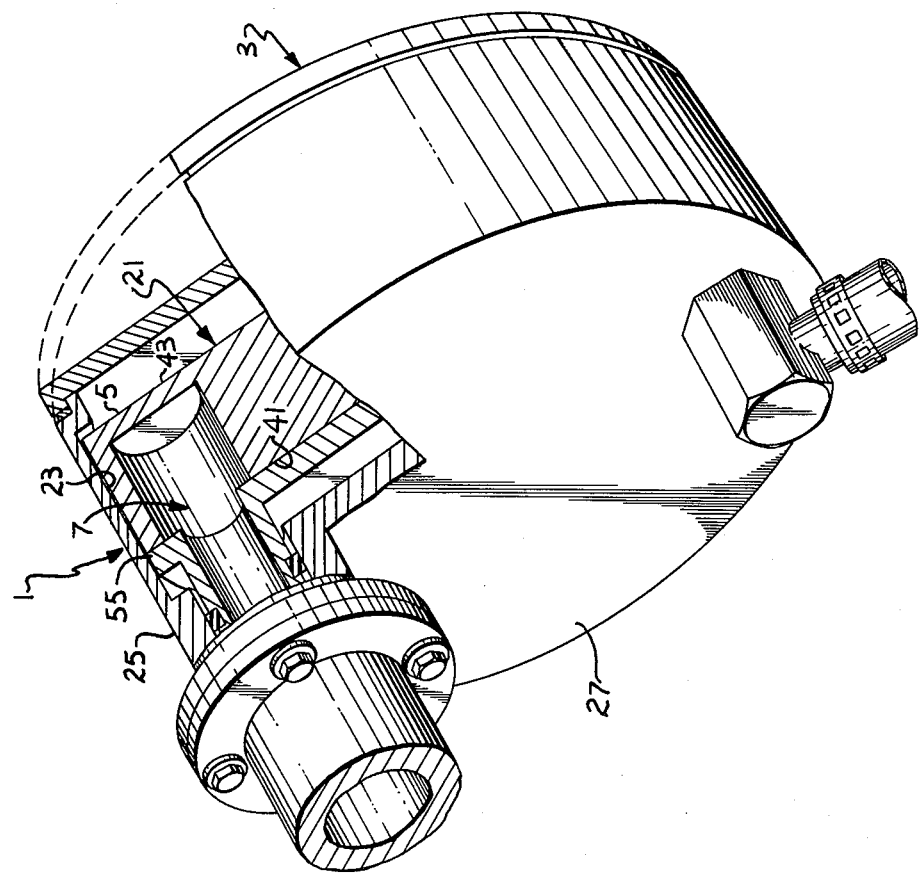

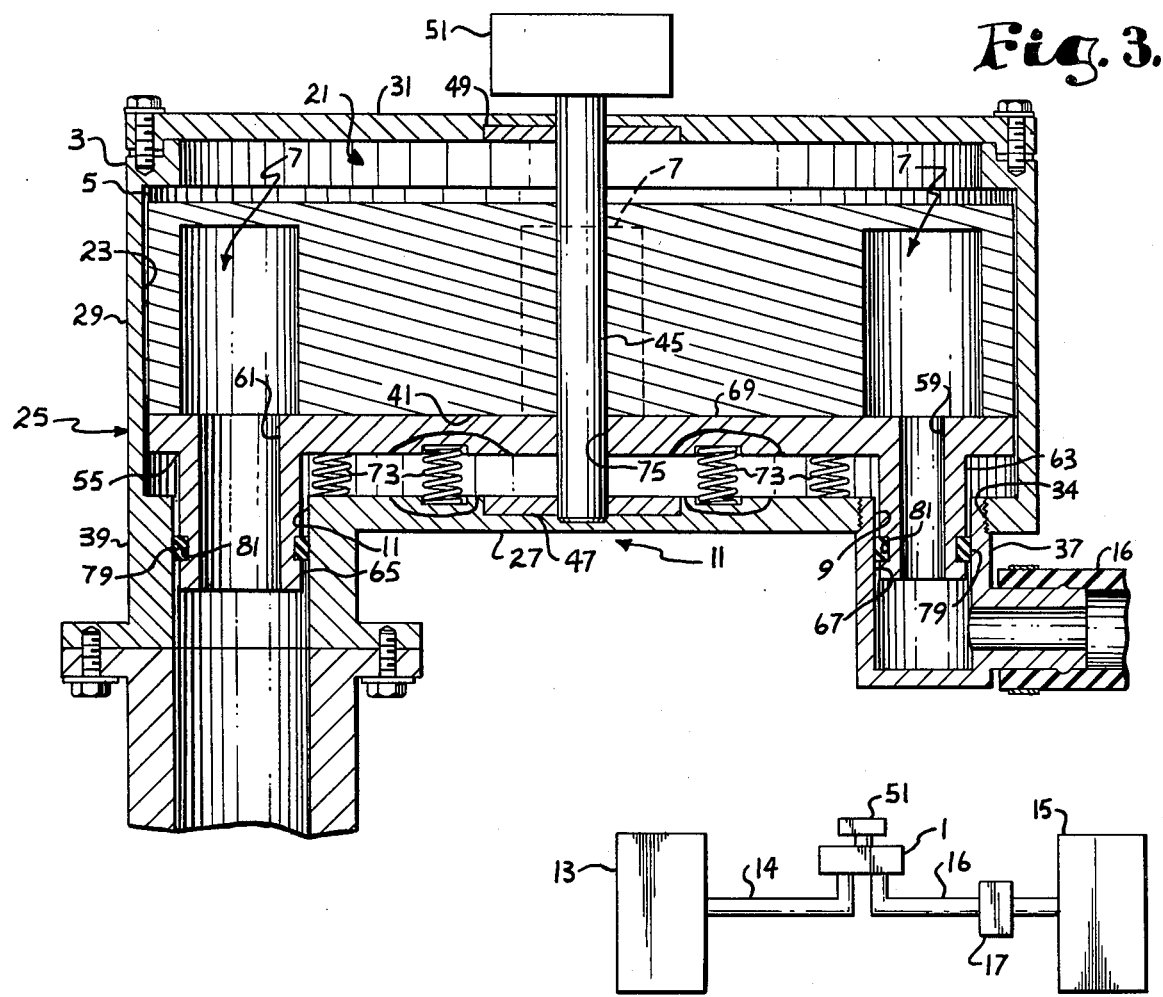
Fig. 3.
Fig. 6.
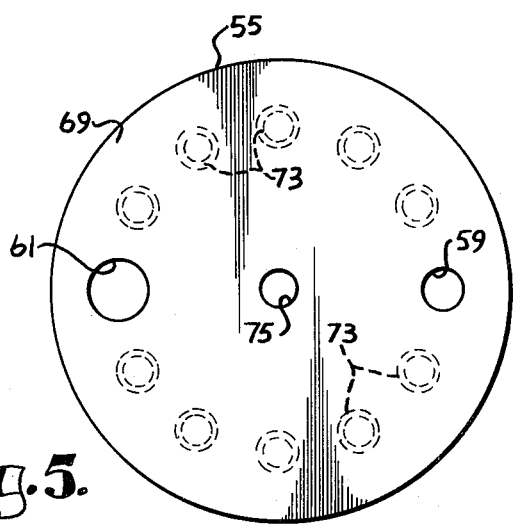
Fig. 4.
Fig. 5.

CHAMBERED ROTARY METERING DEVICE

BACKGROUND OF THE INVENTION

This invention relates to a fluid metering device and in particular to a chambered rotary metering device for use with both gases and liquids.

Devices which meter proportional quantities of fluids are in common usage. A typical example is that of a carburetor of an internal combustion engine which meters proportionate amounts of vaporized fuel, such as gasoline, and air. There are many drawbacks to such systems with one being that, if one of the fluids to be metered is liquid and the other is gaseous, the ratio of liquid to gas can vary widely because the density of the gas varies proportionally with the temperature of the gas whereas the density of the liquid is substantially constant. A problem also occurs when the liquid is vaporized and then mixed with a gas such as in the carburetor of an internal combusion engine. Generally the temperature, and therefore density, of the vaporized fuel is different than that of the air entering the carburetor. Because of this, engines using such mixtures are inherently inefficient because the optimum air to fuel mixture ratio is only achieved when the air entering the carburetors is at a certain temperature, which temperature is typically only present for a certain ambient temperature. At all other ambient temperatures the air to fuel ratio will be non-optimum, resulting in inefficiency in performance.

A further problem encountered when utilizing a fuel metering device such as a carburetor is that when using some fuels there is a possibility of flashback occuring because of the inherent continuous supply of fuel to the carburetor. This is particularly problematic when using hydrogen as a fuel source for the internal combustion engine.

SUMMARY OF THE INVENTION

A chambered rotary metering device is provided herein and is used to accurately meter proportionate ratios of fluids, especially gases. The metering device comprises a housing having a rotor therein. The rotor includes one or more radially disposed, circumferentially spaced chambers which are rotated into fluid flow communication alternately with an inlet and an outlet of the housing. The housing inlet is further in flow communication with a suitable fluid supply source with the housing outlet being in flow communication with a system into which the metered fluids are passed. An example of such a system would be an internal combustion engine wherein the device meters proportionate quantities of gases, such as vaporized lpg (liquified petroleum gas) and air or, hydrogen and oxygen.

The rotor can include circumferentially spaced sets of more than one radially disposed chamber, with the chambers of each set being rotated into flow communication position with the inlet and outlet simultaneously during each revolution of the rotor. In such case, the housing will include a suitable number of inlets, each in further flow communication with a suitable fluid source. Such a metering device will receive a volumetric quantity of fluid in the chambers and outlet the quantities into a single outlet line mixing the fluids in a desired proportion.

It is necessary when metering gases with such a device that the pressure at the inlet be greater than the pressure at the outlet so that there is continually a pressure gradiant existing in the metering device from inlet to outlet to bias the gases through the inlet of the housing into the rotor chamber and then out of the chamber and through the housing outlet. When used with an internal combustion engine which operates under a conventional "Otto" cycle having a piston reciprocating within the cylinder, the pressure during the intake cycle within the cylinder and the intake manifold will be decreasing because of the expanding volume. Therefore, when a chamber is rotated into flow communication with the housing outlet, the gases within the chamber will be exposed to a pressure less than that which they are exhibiting with the result being that the gases will expand and be substantially biased into the cylinder.

The metering device is particularly well adapted to mix proportionate volumetric quantities of two or more gaseous fuels such as hydrogen and oxygen, or air and vaporized lpg. In doing so, and assuming that the sources of the gases are supplied at the same temperature and pressure, the volumetric proportion of each fuel entering into the chamber then being mixed in the housing outlet will be constant with the resultant gaseous mixture being accurately and optimumly proportioned for complete combustion.

In order to provide a variable supply of fluids at the outlet of the housing, the rotational speed of the rotor can be varied by suitable hydraulic or electric motor. In doing so, the metering device functions as an accelerator.

OBJECTS OF THE INVENTION

Therefore, the objects of the present invention are: to provide a metering device for fluids which will accurately meter volumetric proportions of fluids at an outlet; to provide such a device which prohibits the occurence of flashback when used to meter volatile fluid such as hydrogen; to further provide such a device which includes a housing having a chambered rotor therein with the housing including an inlet and an outlet; to provide such a metering device which includes a rotation means to rotate the rotor, exposing the chambers alternately to the inlet and the outlet and to provide a means to vary the speed of rotation of the rotor within the housing; to provide such a device having a rotor which includes at least one radially aligned chamber therein which is biased into flow communication with a single inlet to the housing; to further provide such a metering device which includes a rotor having a plurality of circumferentially spaced chambers, each aligned to be sequentially biased into flow communication with a housing inlet upon rotation of the rotor; to further provide such a metering device wherein the rotor includes at least one set of two or more radially aligned chambers which are positionable in flow communication with two housing inlets and which are further positionable in flow communication with a single outlet for mixing the fluids passing through the inlets into the chambers; and to further provide such a metering device which is easy to manufacture, simple in design, durable in use and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a first embodiment of a metering device according to the present invention with portions broken away to show details thereof.

FIG. 2 is a side elevational view of the metering device as shown in FIG. 1.

FIG. 3 is a cross-sectional view of the metering device.

FIG. 4 is a bottom plan view of a rotor of the metering device.

FIG. 5 is a top plan view of a base plate of the metering device.

FIG. 6 is a block diagram of a system utilizing a metering device disclosed herein.

DETAILED DESCRIPTION OF THE PREFERRED EMBODIMENT

Figure 8:
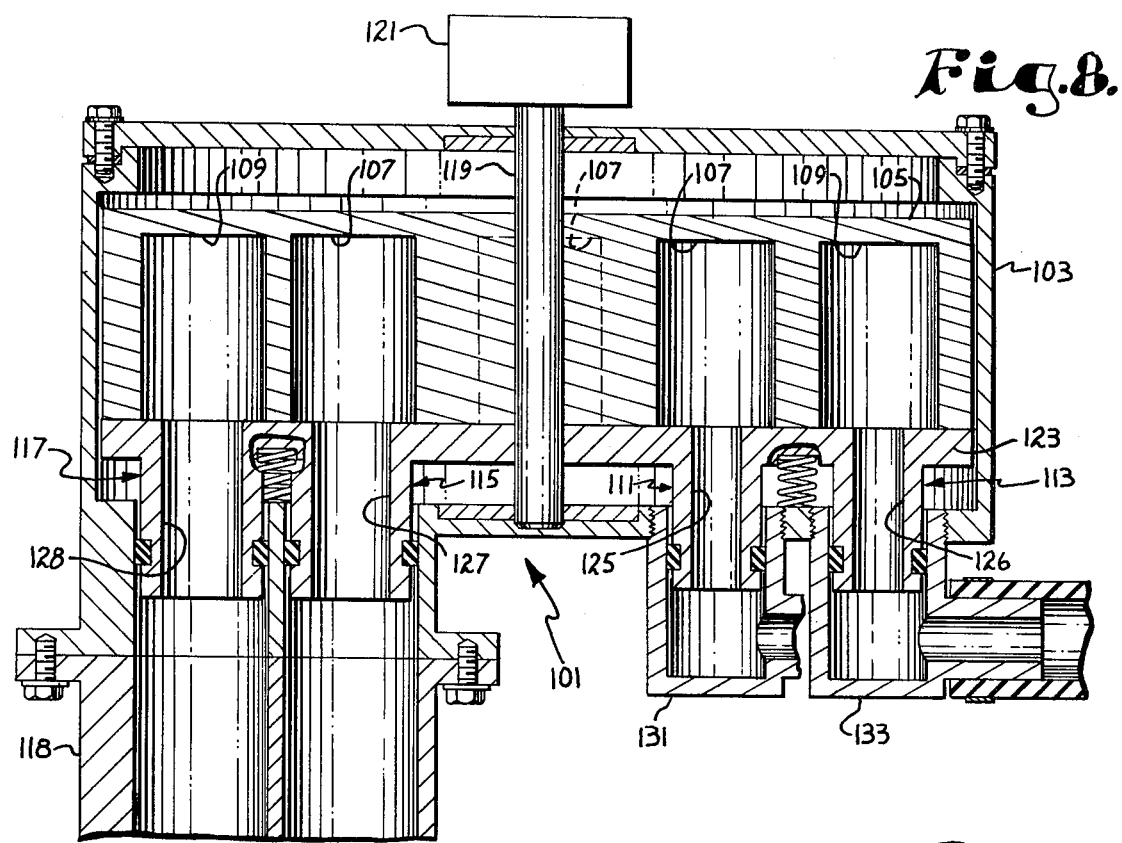
FIG. 8 is a cross-sectional view of a second embodiment of the present invention including a rotor having sets of two radially aligned chambers.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a chambered rotary metering device according to the present invention. The metering device 1 generally includes an outer housing 3 in which is received a rotor 5 which rotates about an axis thereof. The rotor 5 includes one or more circumferentially spaced, radially disposed chambers 7 which alternately are aligned with an inlet port 9 and an outlet port 11 in housing 3 upon rotation of the rotor.

The metering device 1 is used to meter accurate volumetric proportions of a fluid to an associated receiving device such as an internal combusion engine 13. As shown in the schematic diagram in FIG. 6, the housing inlet port 9 is in flow communication with a suitable fluid supply 15 through conduit 16 and the housing outlet port 11 is in flow communication with the internal combustion engine 13 through conduit 14. It is envisioned that the metering device 1 will be used to supply a mixture of suitable combustible gases such as hydrogen and oxygen to the internal combustion engine 13. As such, the supply 15 includes a suitable supply of both hydrogen and oxygen. It is understood that the supply 15 could actually comprise two individual supply tanks with the gases flowing from each tank being combined in a mixer (not shown) prior to flow communicating with the inlet port 9. Suitable pressure regulators, shown herein at 17, are provided to selectively control the pressure in the inlet conduit 16. If a mixer, (not shown), is used to combine two or more gases prior to entrance into the supply conduit 16, each conduit (not shown) from each individual gas supply will preferably contain a pressure regulator. It is understood that the metering device 1 can be used to provide accurate volumetric proportions of fluids, including liquids, other than hydrogen and oxygen and to provide such proportions to a suitable end device therefore other than an internal combustion engine. It is also understood that the metering device 1 can be utilized in mixing volatile fluids since flashback is prohibited by the usage of the metering device.

In further describing the metering device, the housing 3 includes a casing 25 which comprises a bottom plate 27 and a side wall 29. The casing 25 includes an inner chamber 21 having a generally cylindrical inner surface 23. A top plate 31 is secured to the casing side wall 29 to form the enclosure.

As seen in FIG. 3, the casing bottom plate 27 includes near a periphery thereof a bore 34 therethrough in which is received a fitting 37 which comprises the inlet port 9. The outlet port 11 is positioned at a generally diametrically opposed position on the bottom plate 27 and comprises a generally tubular extension 39 which extends outwardly of the casing bottom plate 27. Both the tubular extension 39 and the inlet fitting 37 are passageways allowing fluid flow therethrough.

The rotor 5 comprises a generally thin cylindrical member having at least one chamber 7 extending inwardly of a bottom surface 41 of the rotor and spaced from an axis thereof. The chambers 7 are generally cylindrical with axes thereof being generally parallel to an axis of the rotor 5. Further, the chambers open toward the housing inlet port 9 and outlet port 11. As shown in FIG. 4, a typical rotor 5 could include four such chambers each spaced equilaterally around an outer periphery 43 of the rotor an equal distance from the rotor axis.

The rotor 5 is retained in the housing 3 by means of an axial drive shaft 45 which is supported by a suitable bearing 47 in the housing bottom plate 27 and rotates relative to suitable bearing 49 in the housing top plate 31. The drive shaft 45 is non-rotatably attached to the rotor such that when the drive shaft 45 is rotated, the rotor 5 rotates likewise. Further, the rotor 5 is nonmovable axially on drive shaft 45. A rotating means such as motor 51 is connected to the drive shaft to rotate the rotor within the housing inner chamber 21. It is desirable that the motor 51 include the ability to have a selectively variable speed of rotation independent of that of the engine 13, as will be explained. Examples of motors suitable for such use include electrical and hydraulic motors.

A seal plate 55 is provided within the housing inner chamber 21 to seal the individual rotor chambers 7 as the rotor 5 rotates. The seal plate 55 is best shown in FIG. 5 and comprises a generally flat circular member including bores 59 and 61 therethrough which are aligned with the housing inlet and outlet ports 9 and 11, respectively. Preferably, passageway 61 is larger in cross-sectional area than passageway 59. As seen in FIG. 3, the seal plate 55 further includes nipples or tubular extensions 63 and 65. Tubular extension 63 is received in the inlet port fitting 37 and tubular extension 65 is received in the outlet port tubular extension 39.

The seal plate 55 includes a top surface 69 which is preferably flat and which sealingly abuts against the rotor bottom surface 41. Springs 73 are provided to continually bias the seal plate 55 into sealing relationship with the rotor 5 as shown in FIG. 3. The springs 73, as shown herein, are equilaterally spaced around a periphery of the seal plate 55 to provide a generally equal pressure continuously around the seal plate 55 to assure that seal plate is in constant sealing relationship with the rotor 5. It is noted that the drive shaft 45 is retained through a bore 75 in the seal plate 55 and rotates freely with respect thereto.

The seal plate tubular extensions 63 and 65 each contain a suitable seal about a lower cylindrical extremity thereof, which will provide a sealed passageway from the rotor chambers 7 through both the outlet port 11 and the inlet port 9. As shown herein, the seal comprises an O-ring 79 which is retained in an annular groove 81 in each of the seal plate tubular extensions 63 and 65. The O-ring 79 sealingly engages an inner surface of the associated inlet fitting 37 and the exhaust port extension 39.

In use, the chambered rotary metering device 1, as shown in FIGS. 1 through 5, transmits metered proportions of fluids from a supply source to an eventual fluid using device. As stated before, a typical use for such a metering device 1 would be to provide an internal combustion engine with a proportional volumetric mixture of gaseous fuels such as hydrogen and oxygen or vaporized lpg and air.

It is necessary in using such a device that the gases at the inlet port 9 exhibit a higher pressure than the pressure in the outlet port 11 such that there is a pressure gradient from the inlet port 9 to the outlet port 11 which functions to bias the gases through the device into the user device such as an intake manifold of an internal combustion engine. Therefore, the pressure in the supply conduit 16 must be greater than that in the outlet port 11.

It is seen that as the drive shaft 45 rotates and therefore rotates the rotor 5, that the rotor chambers 7 alternately are biased into fluid flow alignment first with the housing inlet port 9 and then with the outlet port 11. When a particular chamber 7 is aligned with inlet port 9 the pressurized gas that is present in the supply line and the inlet port fitting 37 expands and is thus biased into the chamber 7, filling the chamber with the gas. This occurs since the gas which exists in the supply conduit 16 is at a greater pressure than that which exists in chamber 7 immediately prior to becoming aligned with the inlet port 9. After that particular filled chamber 7 is rotated to a position where it is in flow communication with the housing outlet port 11, the fluid which is in the chamber 7 will expand into the outlet port 11 and on into the intake manifold of the engine because the pressure in the chamber 7 is greater than that in the intake manifold. It is envisioned that the pressure of the supply conduit 16 will generally be in the range of from atmospheric pressure, or 14.7 pounds per square inch, to approximately 20 pounds per square inch. This pressure is continuously present in the intake fitting 37 when the chambers 7 are rotated into flow communication with the inlet port 9. Because of this, the chambers 7, after they have been charged with the fluid, will exhibit a pressure generally of that which is in the supply conduit 16.

Assuming that an internal combustion engine operating under the "Otto" cycle is used, when the engine begins the intake stroke such that the piston within the engine begins to travel downwardly in the cylinder, the pressure within the housing outlet port 11 decreases, because of the increase in volume in the cylinder, to a much lower level, which level is less than that which in the charged rotor chamber 7. Therefore, when a charged chamber 7 is rotated into flow communication with the outlet port 11, there is a pressure gradient between the chamber 7 and the outlet port 11 and the gas contained in the chambers will flow into the outlet 11 and on into the cylinder of the engine 13.

Since the motor 51, which rotates the rotor 5, is capable of variable rotation speed the amount of fuel passing through the metering device 1 can be varied by simply varying the speed of the motor 51. As such the metering device 1 can be used as an accelerator, requiring only that the rotational speed of the motor 51 be increased to increase the corresponding engine output.

Figure 7:
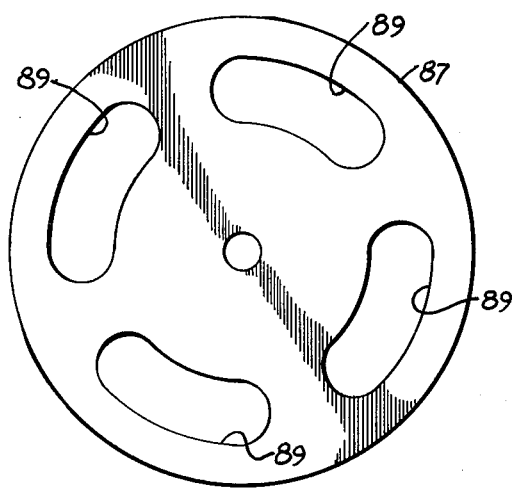
FIG. 7 is a plan view of a second rotor which can be used in the embodiment of the invention shown in FIG. 1.

FIG. 7 shows a rotor 87 which can be used in place of rotor 5 in the metering device 1. The rotor 87 includes arcuately elongated chambers 89 in place of chambers 7 which, as seen, are generally cylindrical. The elongate chambers 89 are exposed to the inlet port 9 and outlet port 11 for a greater degree of rotation of the rotor 5. This allows a greater volume of fluid to be injected into the chambers 89 than was available with the chambers 7. Because of this the corresponding output of the engine 13 is greater per revolution of the rotor 87.

Figure 9:
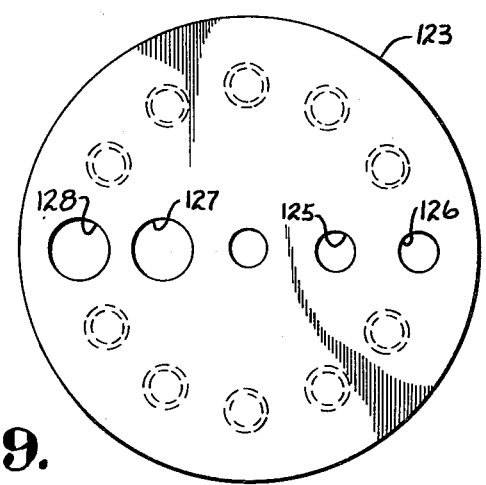
FIG. 9 is a plan view of a base plate of the second embodiment of the present invention.

FIGS. 8 and 9 show a second embodiment of a metering device according to the present invention and is generally designated by the reference numeral 101. The metering device 101 comprises a housing 103 including a chambered rotor 105 therein. The rotor 105 includes circumferentially spaced sets of radially aligned chambers 107 and 109. As shown herein, chambers 107 and 109 are generally of the same size but is is anticipated that they could be of different size. Further, it is envisioned that more than two such chambers could comprise each set.

Chambers 107 and 109 simultaneously align with individual inlet ports 111 and 113 respectively and individual outlet ports 115 and 117 respectively. Preferably, the outlet port 115 and 117 are larger in cross-sectional area than the inlet ports 111 and 113. Further, the outlet ports 115 and 117 empty into a collector 118 in which fluids emitting from the exhaust ports 115 and 117 are mixed.

The rotor further is provided with a drive shaft 119 driven by a suitable variable speed motor 121. A seal plate 123 is provided which functions the same as seal plate 55 as shown in FIGS. 1 through 5 but which includes two inlet bores 125 and 126 and two outlet bores 127 and 128 each of which respectively align with a chamber 107 and 109 so as to be in flow communication therewith.

Figure 10:
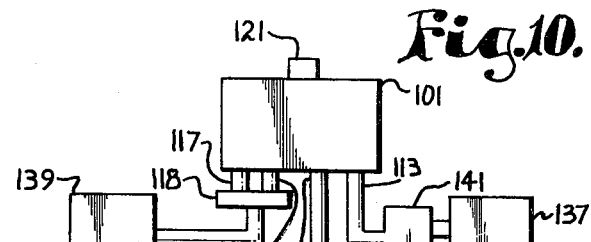
FIG. 10 is a block diagram of a system utilizing a metering device according to a second embodiment of the present invention.

As shown in FIG. 7, the inlet ports 111 and 113 each include a suitable inlet fitting 131 and 133, respectively, each of which is connected to an associated supply 135 and 137, FIG. 10. The supplies 135 and 137 each contain a different fluid and are provided with a pressure regulator to control the pressure of the respective fluid as it is provided to the inlet ports 111 and 113. For example, supply 135 can contain pressurized air and supply 137 can contain a suitable lpg (liquified petroleum gas). As such, the mixing device 101 can be used as a metering unit for an internal combustion engine 139 using lpg as a fuel therefore.

Such a use of the mixing device would assure that the engine 139 would receive accurately proportioned mixtures of lpg to air. This is particularly hard to achieve when modifying carburetors of existing internal combustion engines for various reasons with one being because the supply of the air used in providing the oxygen for combustion of the fuel is not of a constant temperature although the vaporized lpg is provided at a generally constant temperature. Therefore, the density of the air varies with a resultant variation of the air to fuel mixture. With a metering device such as that shown in FIGS. 8 and 9, an optimum ratio of air to lpg can be achieved and maintained provided that the supplies 135 and 137 are kept at a constant temperature and pressure. This would assure that the density of two gasses remained constant.

It is envisioned that a pressure regulator 141 can be used to regulate the pressure of the lpg. The air supply 135 can be a suitable compressor which is run either hydraulically or electrically, the output pressure of which can be adjustable such that the optimum mixture of air to lpg be attained.

It is to be understood that while certain forms of the present invention have been illustrated and described herein, it is not to be limited to the specific forms or arrangement of parts described and shown.

What is claimed and desired to secure by Letters Patent is as follows:

1. A chambered rotary metering device comprising:
   (a) a housing having an internal chamber therein with an inlet port and an outlet port leading thereinto;
   (b) a rotor retained within said housing and adapted for rotational motion about an axis thereof, said rotor including at least one radially disposed and axially aligned chamber extending inwardly of a surface of said rotor, said surface being opposed to said inlet and outlet ports and said chamber being non-concurrently alignable with said inlet and outlet ports upon rotation of said rotor;
   (c) a motor means engaging said rotor and providing rotational impetus thereto for alternately biasing said chamber into fluid flow alignment with said inlet and outlet ports, said chamber adapted to be charged with a volumetric quantity of fluid when in fluid flow alignment with said inlet port and said chamber adapted to exhaust said volumetric quantity of fluid into said outlet port when biased into fluid flow alignment therewith;
   (d) a seal plate non-rotatably retained in said housing between said rotor and said inlet and outlet ports, said seal plate including a first bore and a second bore therethrough aligned with said inlet and outlet ports respectively; said seal plate including no structure to allow direct flow of fluid from said inlet port to said outlet port through said seal plate; said seal plate including a surface sealably mating with said rotor surface; and
   (e) biasing means to urge said seal plate into constant sealable engagement with said rotor whereby said chamber is sealed preventing said fluid from exhausting therefrom, when said chamber is rotated out of fluid flow alignment with either said inlet or said outlet port.

2. The device as set forth in claim 1 wherein:
   (a) said housing inner chamber includes a generally cylindrical inner surface; and
   (b) said rotor is generally cylindrical having a flat bottom surface with said rotor chambers extending inwardly therefrom.

3. The device as set forth in claim 2 wherein:
   (a) said seal plate has a flat top surface, said rotor bottom surface and said seal plate top surface comprising said respective mating surfaces.

4. The device as set forth in claim 1 wherein:
   (a) said rotor includes a plurality of circumferentially spaced chambers each an equal distance from an axis of said rotor.

5. The device as set forth in claim 4 wherein:
   (a) said rotor includes four radially disposed, circumferentially spaced chambers.

6. The device as set forth in claim 1 wherein:
   (a) said inlet port is in flow communication with a fluid supply, and
   (b) said outlet port is in flow communication with an end user device of said fluid.

7. The device as set forth in claim 6 wherein:
   (a) said fluid is gaseous;
   (b) said supply exhibits a first absolute pressure;
   (c) said user device exhibits a second absolute pressure; and
   (d) said first pressure is greater than said second pressure, and means is provided to establish a pressure gradient through said device to bias said gas from said supply to said user device.

8. The device as set forth in claim 1 wherein:
   (a) said outlet port exhibits a greater cross-sectional area than said inlet port.

9. The device as set forth in claim 7 wherein:
   (a) said fluid supply is a source of a mixture of a gaseous fuel and oxygen; and
   (b) said end user device is connected to an internal combustion engine.

10. The device as set forth in claim 3 wherein:
    (a) said housing includes a plurality of radially aligned sets of inlet ports and a radially aligned set of outlet ports; and
    (b) said rotor includes at least one set of radially aligned chambers, each of said chambers aligned with a respective inlet port and a respective outlet port.

11. The device as set forth in claim 10 wherein said housing outlet ports flow communicate with a collector for mixing fluids emitting from each of the set of chambers.

12. The device as set forth in claims 3 or 10 wherein:
    (a) said chambers are cylindrical.

13. The device as set forth in claims 3 or 10 wherein:
    (a) said chambers are arcuately elongate.

14. A chambered rotary metering device comprising:
    (a) a housing having an internal chamber therein with an inlet port and an outlet port leading thereinto; said housing comprises a casing having a bottom plate;
    (b) a rotor retained within said housing and adapted for rotational motion about an axis thereof, said rotor including at least one radially disposed chamber extending inwardly of a surface of said rotor, said surface being opposed to said inlet and outlet ports;
    (c) a motor means engaging said rotor and providing rotational impetus thereto for alternately biasing said chamber into fluid flow alignment with said inlet and outlet ports, said chamber adapted to be charged with a volumetric quantity of fluid when in fluid flow alignment with said inlet port and said chamber adapted to exhaust said volumetric quantity of fluid into said outlet port when biased into fluid flow alignment therewith;

(d) a seal plate non-rotatably retained in said housing between said rotor and said inlet and outlet ports, said seal plate including a bore therethrough aligned with each of said inlet and outlet ports; said seal plate including a surface sealably mating with said rotor surface;

(e) said seal plate has a flat top surface, said rotor bottom surface and said seal plate top surface comprising said respective mating surfaces;

(f) said inlet port and said outlet port each includes a passageway extending outwardly from said housing bottom plate;

(g) said seal plate includes a tubular extension associated with each of said bores therethrough and extending into said respective housing inlet and outlet passageways;

(h) said seal plate extensions include a seal means therearound to seal each of said extensions with a respective inlet and outlet passageway; and (i) biasing means to urge said seal plate into constant sealable engagement with said rotor whereby said chamber is sealed preventing said fluid from exhausting therefrom, when said chamber is rotated out of fluid flow alignment with either said inlet or said outlet port.

15. The device as set forth in claim 14 wherein:
(a) said housing bottom plate passageways have a cylindrical inner surface;
(b) said seal plate extensions house a generally cylindrical outer surface, and
(c) said seal means comprises an O-ring retained in an annular groove formed in said respective extension outer surface, said O-ring sealingly engaging said passageway inner surface.

* * * * *